(12) United States Patent
Ryu et al.

(10) Patent No.: US 8,095,309 B2
(45) Date of Patent: Jan. 10, 2012

(54) GPS ASSISTED VEHICULAR LONGITUDINAL VELOCITY DETERMINATION

(75) Inventors: Jihan Ryu, Rochester Hills, MI (US); Cheng-Foo Chen, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1253 days.

(21) Appl. No.: 11/758,059

(22) Filed: Jun. 5, 2007

(65) Prior Publication Data

US 2008/0306687 A1   Dec. 11, 2008

(51) Int. Cl.
*G01C 21/00*   (2006.01)
(52) U.S. Cl. .......... 701/213; 701/36; 701/119; 701/301; 340/441; 73/1.37; 702/142
(58) Field of Classification Search .................. 701/213, 701/36, 216, 221, 220, 214, 119, 301; 340/995.1, 340/995.27, 990, 995.2, 441; 73/178 R, 73/1.37; 702/142
See application file for complete search history.

(56) References Cited

U.S. PATENT DOCUMENTS

| | | | | | |
|---|---|---|---|---|---|
| 5,862,511 | A | * | 1/1999 | Croyle et al. | 701/213 |
| 6,029,111 | A | * | 2/2000 | Croyle | 701/207 |
| 6,308,134 | B1 | * | 10/2001 | Croyle et al. | 701/220 |
| 6,671,587 | B2 | * | 12/2003 | Hrovat et al. | 701/1 |
| 6,671,595 | B2 | * | 12/2003 | Lu et al. | 701/36 |
| 6,847,875 | B2 | | 1/2005 | Lu et al. | |
| 6,915,193 | B2 | * | 7/2005 | Lu et al. | 701/38 |
| 7,096,116 | B2 | * | 8/2006 | Tanaka et al. | 701/200 |
| 7,426,437 | B2 | * | 9/2008 | Breed et al. | 701/301 |
| 2003/0130775 | A1 | * | 7/2003 | Lu et al. | 701/36 |
| 2003/0130778 | A1 | | 7/2003 | Busse | |
| 2003/0149512 | A1 | * | 8/2003 | Hrovat et al. | 701/1 |
| 2003/0191568 | A1 | * | 10/2003 | Breed | 701/36 |
| 2004/0172183 | A1 | * | 9/2004 | Lu et al. | 701/38 |
| 2004/0204798 | A1 | * | 10/2004 | Imada et al. | 701/1 |
| 2005/0143916 | A1 | * | 6/2005 | Kim et al. | 701/214 |
| 2007/0027583 | A1 | * | 2/2007 | Tamir et al. | 701/1 |
| 2008/0086251 | A1 | * | 4/2008 | Lu et al. | 701/70 |
| 2008/0177495 | A1 | * | 7/2008 | Gold | 702/127 |
| 2008/0294342 | A1 | * | 11/2008 | Hoshizaki et al. | 701/216 |
| 2008/0306687 | A1 | * | 12/2008 | Ryu et al. | 701/213 |
| 2009/0037058 | A1 | * | 2/2009 | Senneff et al. | 701/50 |
| 2010/0017128 | A1 | * | 1/2010 | Zeng | 701/301 |
| 2010/0047744 | A1 | * | 2/2010 | Miura | 434/66 |
| 2010/0060443 | A1 | * | 3/2010 | Wakao et al. | 340/444 |
| 2010/0312473 | A1 | * | 12/2010 | Hoshizaki | 701/213 |

(Continued)

FOREIGN PATENT DOCUMENTS

DE   10247994 A1   4/2004
(Continued)

OTHER PUBLICATIONS

Simultaneous identification of tire cornering stiffnesses and vehicle center of gravity; Sivaramakrishnan, S.; American Control Conference, 2008; Digital Object Identifier: 10.1109/ACC.2008.4586925; Publication Year: 2008 , pp. 2846-2851.*

(Continued)

*Primary Examiner* — Cuong H Nguyen (57) ABSTRACT

A vehicle includes a GPS system and a longitudinal accelerometer. Accelerometer corrections are derived based on GPS velocity data. Individual wheel speeds are determined based on GPS velocity data. Longitudinal vehicle velocity may be determined based on accelerometer data or individual wheel speeds.

13 Claims, 7 Drawing Sheets

U.S. PATENT DOCUMENTS

| | | | | |
|---|---|---|---|---|
| 2010/0332266 | A1* | 12/2010 | Tamir et al. | 705/4 |
| 2011/0066376 | A1* | 3/2011 | Takaoka | 701/220 |

FOREIGN PATENT DOCUMENTS

| | | | |
|---|---|---|---|
| DE | 102004003877 A1 | | 8/2004 |
| DE | 10200404805 A1 | | 9/2004 |
| JP | 2003-017751 | * | 1/2003 |
| JP | 2003-067324 | * | 2/2003 |
| JP | 2006-335883 | * | 12/2006 |
| JP | 2008-212757 | * | 8/2008 |
| JP | 2009-211997 | * | 9/2009 |
| KR | 2003-97845 | * | 12/2003 |
| WO | PCT/IL2004/000610 | * | 7/2004 |

OTHER PUBLICATIONS

A nested PID steering control for lane keeping in vision based autonomous vehicles; Marino, R.; Scalzi, S.; Orlando, G.; Netto, M.; American Control Conference, 2009. ACC '09. Digital Object Identifier: 10.1109/ACC.2009.5160343; Publication Year: 2009 , pp. 2885-2890.*

Algorithms for Real-Time Estimation of Individual Wheel Tire-Road Friction Coefficients; Rajamani, R.; Phanomchoeng, G.; Piyabongkarn, D.; Lew, J. Y.; Mechatronics, IEEE/ASME Transactions on; Volume: PP , Issue: 99; Digital Object Identifier: 10.1109/TMECH.2011.2159240; Publication Year: 2011 , pp. 1-13.*

Tire-road forces estimation using extended Kalman filter and sideslip angle evaluation; Dakhlallah, J.; Glaser, S.; Mammar, S.; Sebsadji, Y.; American Control Conference, 2008; Digital Object Identifier: 10.1109/ACC.2008.4587220; Publication Year: 2008 , pp. 4597-4602.*

Vehicle yaw rate control based on piecewise affine regions; Benine-Neto, A.; Scalzi, S.; Netto, M.; Mammar, S.; Pasillas-Lepine, W.; Intelligent Vehicles Symposium (IV), 2010 IEEE; Digital Object Identifier: 10.1109/IVS.2010.5548062 Publication Year: 2010 , pp. 20-25.*

Stabilization of Automotive Vehicles Using Active Steering and Adaptive Brake Control Allocation; Tjonnas, J.; Johansen, T.A.; Control Systems Technology, IEEE Transactions on; vol. 18 , Issue: 3; Digital Object Identifier: 10.1109/TCST.2009.2023981; Publication Year: 2010 , pp. 545-558.*

Yaw-rate control for electric vehicle with active front/rear steering and driving/braking force distribution of rear wheels; Ando, N.; Fujimoto, H.; Advanced Motion Control, 2010 11th IEEE International Workshop on; Digital Object Identifier: 10.1109/AMC.2010.5464040; Publication Year: 2010 , pp. 726-731.*

An in-vehicle inertia test platform for dynamics control system; Pan Shenghui; Wang Qidong; Jiang Wuhua; Computer, Mechatronics, Control and Electronic Engineering (CMCE), 2010 International Conference on; vol. 3 Digital Object Identifier: 10.1109/CMCE.2010.5610302; Publication Year: 2010 , pp. 416-419.*

* cited by examiner

GPS ASSISTED VEHICULAR LONGITUDINAL VELOCITY DETERMINATION

TECHNICAL FIELD

The present invention generally relates to vehicle dynamics control. More particularly, the invention relates to determining longitudinal vehicle velocity in a vehicle dynamics control system.

BACKGROUND OF THE INVENTION

Accurate knowledge of longitudinal vehicle velocity can be used to improve many vehicle dynamics control systems. For example, the Anti-lock Braking System (ABS) controller can maximize the braking force and minimize the stopping distance. However, the vehicle's longitudinal velocity is usually not available in production vehicles. Wheel speeds are used instead in many situations. But wheel speeds do not represent the vehicle's longitudinal velocity when excessive tire slip exists.

Several methods have been proposed to determine longitudinal vehicle velocity. Certain methods use wheel speeds and longitudinal acceleration to determine longitudinal vehicle velocity and, therefore, need compensation for sensor bias, changes of rolling radii of wheels, and longitudinal slip. It has also been proposed to use the global positioning satellite system (GPS) in vehicle velocity calculations. However, this method suffers from low bandwidth because common GPS receivers have less than 10 Hz update rate and it is too low for vehicle dynamics control applications.

SUMMARY OF THE INVENTION

A vehicle includes a longitudinal accelerometer and a GPS. A method for determining longitudinal acceleration of the vehicle includes measuring a signal from the longitudinal accelerometer. Further, the method includes determining a sensitivity and bias of the longitudinal accelerometer using a measure of vehicle longitudinal velocity provided by the GPS, a measure of vehicle lateral velocity, and a measure of vehicle yaw rate. Finally, the method includes applying the sensitivity and bias to the measured signal from the longitudinal accelerometer. Vehicle longitudinal velocity may be estimated by integrating the longitudinal acceleration.

Furthermore, individual wheel speeds are determined by calculating longitudinal and lateral velocity at the vehicle center of gravity (CG) using OPS velocity and vehicle yaw rate; calculating individual wheel longitudinal and lateral velocities from the longitudinal and lateral velocity at the vehicle CG and wheel distribution relative to the vehicle CG; and calculating individual wheel speeds using the individual wheel longitudinal and lateral velocities and steering angles. Vehicle longitudinal velocity may be estimated by integrating the longitudinal acceleration or from individual wheel speeds.

BRIEF DESCRIPTION OF THE DRAWINGS

The invention may take physical form in certain parts and arrangement of parts, the preferred embodiment of which will be described in detail and illustrated in the drawings incorporated hereinafter, wherein.

DETAILED DESCRIPTION

Figure 1:
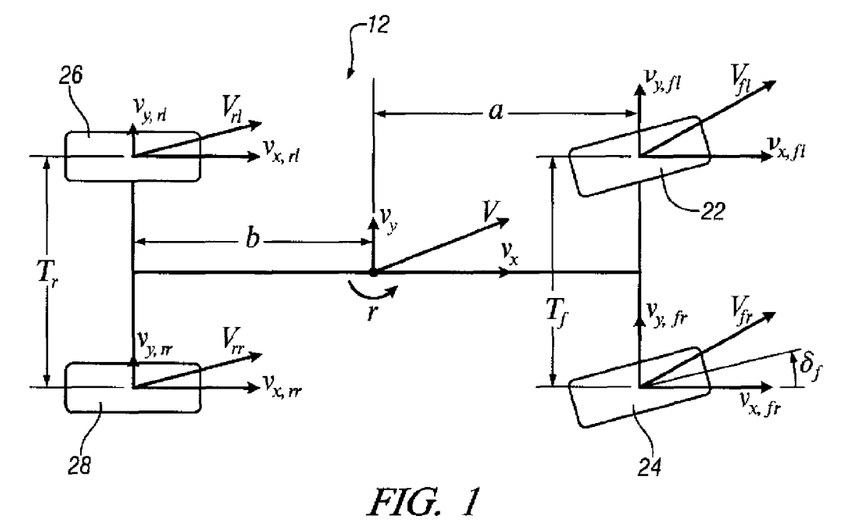
FIG. 1 is a schematic illustration of a vehicle experiencing a turning maneuver.

Referring to FIG. 1, a vehicle 12 experiencing a turning maneuver is illustrated. Longitudinal and lateral velocities at a center of gravity are indicated as $v_x$ and $v_y$, respectively. A yaw rate is denoted as r and a front steering angle is represented by $\delta_f$. The distance between the center of gravity of the vehicle and the front axle is a, and the distance between the center of gravity of the vehicle and the rear axle is b. $T_f$ and $T_r$ are the track widths for the front and rear axles. And, $v_{x,fl}$, $v_{x,fr}$, $v_{x,rl}$, and $v_{x,rr}$ represent longitudinal velocities at the four wheels (front-left, front-right rear-left, and rear-right respectively). Similarly, $v_{y,fl}$, $v_{y,fr}$, $v_{y,rl}$, and $v_{y,rr}$ denote lateral velocities at the four wheels a left front wheel 22, a front right wheel 24, a left rear wheel 26, and a right rear wheel 28.

Figure 2:
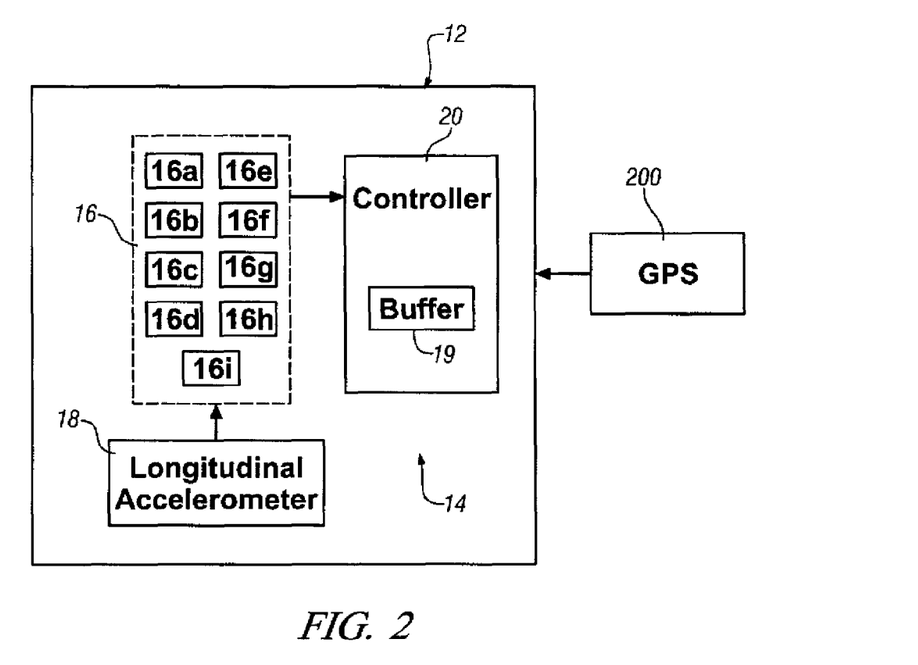
FIG. 2 is a block diagram of the vehicle of FIG. 1 in communication with a GPS.

FIG. 2 generally illustrates a vehicle dynamics control system 14 in a vehicle 12 in communication with the global positioning system (GPS) 200. A plurality of sensors or systems 16 is provided to communicate signals from a number of vehicle systems to a controller 20. Vehicle dynamics control system 14 includes controller 20 used for receiving information or signals from a number of sensors or systems which may include antilock brake system (ABS) status 16a, traction control system (TCS) status 16b, GPS data 16c including GPS velocity, yaw rate 16d, wheel speed (at each wheel) 16e, lateral acceleration 16f, a steering angle (hand wheel position) 16f, longitudinal acceleration 16g from a longitudinal accelerometer 18, pitch rate 16h, and steering angle position 16i. Steering angle position of the steered road wheels 16i. Lateral acceleration, longitudinal acceleration, yaw rate, roll orientation and speed may also be obtained using the global positioning system (GPS). Based upon signals 16a-i, controller 20 controls the vehicle dynamics system 14 and may store the signals 16a-i. Depending on the desired sensitivity, the type of control system and various other factors, not all of the enumerated signals may be used in a commercial application.

Figure 3:
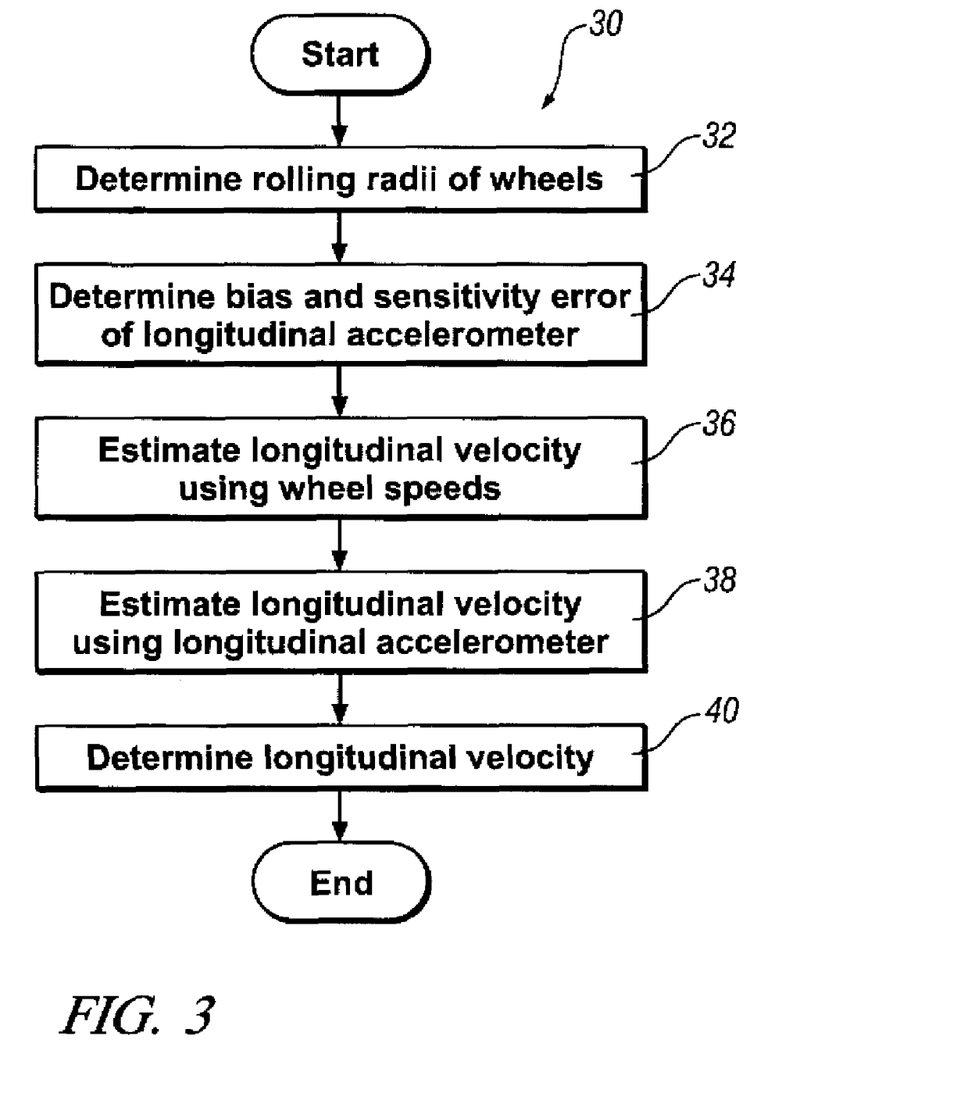
FIG. 3 is a flow-chart illustrating a method of determining rolling radii of wheels, bias and sensitivity error of a longitudinal accelerometer, and longitudinal vehicle velocity.

In an embodiment of the invention, a method 30 for correcting longitudinal accelerometer and determining longitudinal vehicle velocity using GPS is shown in FIG. 3. Initially, rolling radii of the wheels 22-28 are determined (32). Bias and sensitivity errors of a longitudinal accelerometer are determined (34). Once the bias and sensitivity errors of the longitudinal accelerometer are determined (34), a longitudinal velocity of the vehicle 12 is estimated (38) and determined (40) using the wheel speeds (36) and a longitudinal accelerometer (38).

Figure 4:
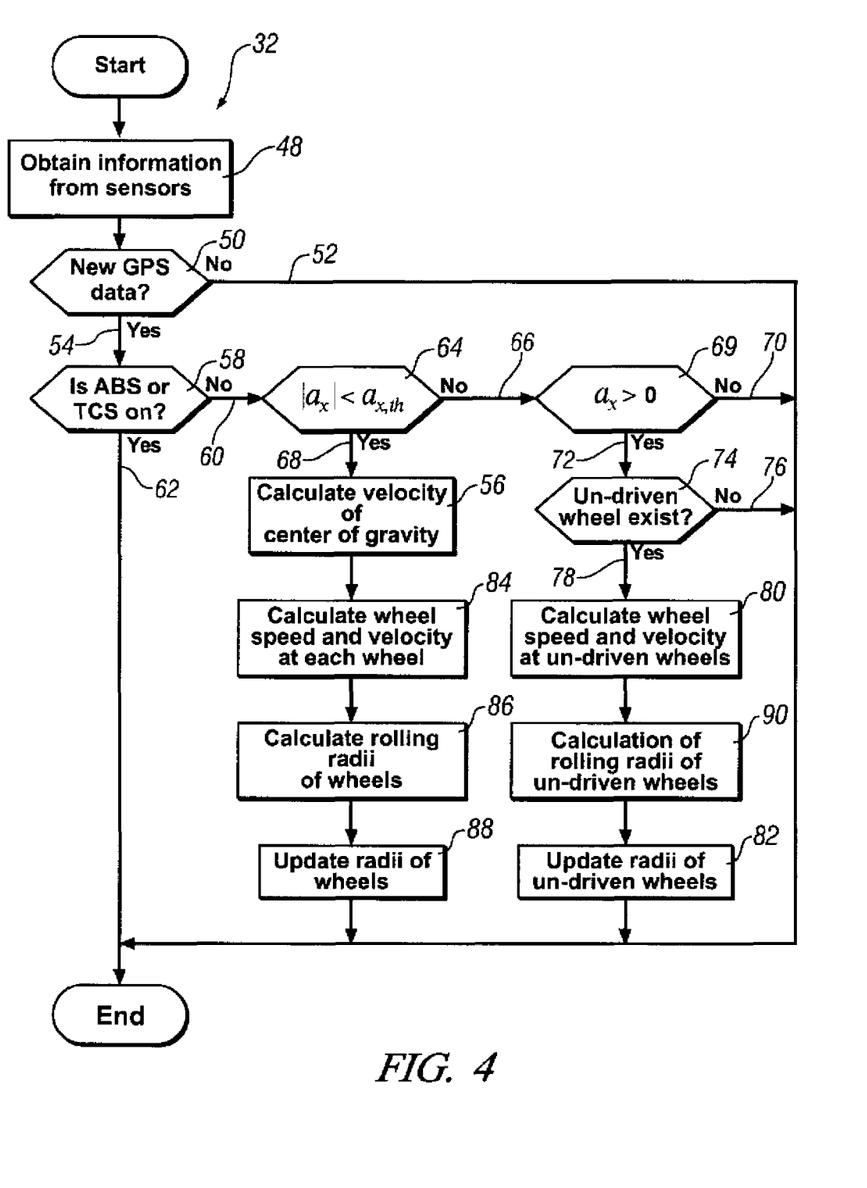
FIG. 4 is a flow-chart illustrating a method of determining rolling radii of wheels.

FIG. 4 is a detailed flowchart showing the method (32) of determining the rolling radii of the wheels 22-28 as generally set forth in FIG. 3. Initially, GPS velocity, anti-lock brake system (ABS) and traction control system (TCS) status (i.e. active/inactive), longitudinal acceleration, and wheel speeds are obtained from the sensors (48). Once information is obtained from the sensors, a determination (50) is made if new GPS data is available. Since the sensed GPS velocity is not always available, the rolling radii are determined and updated only when the GPS velocity is available and when neither ABS nor TCS is active because excessive longitudinal slip at the wheels can activate the ABS and TCS systems. If GPS velocity is not available (52) or if either ABS or TCS is active (62), the rolling radii are not updated.

If GPS velocity is available (54) and if ABS and TCS are not active (60), the following condition shown in Equation 1 is checked (64) to avoid situations where excessive slip exists at the wheels.

$$|a_x| < a_{x,th} \quad (1)$$

wherein, $a_x$ is the longitudinal acceleration of the vehicle and $a_{x,th}$ is a vehicle dependent threshold for longitudinal acceleration.

If the absolute value of $a_x$ is less than $a_{x,th}$ (68), then the longitudinal velocities at all wheels are calculated using the GPS velocity. The longitudinal and lateral velocities at the center of gravity are initially calculated (56) from the GPS velocity by taking into account the GPS antenna position and yaw rate. Once the longitudinal and lateral velocities at the center of gravity are calculated (56), the longitudinal and lateral velocities at each wheel are calculated (84) from the longitudinal and lateral velocities at the center of gravity using Equation 2:

$$v_{x,fl} = v_x - rT_f/2, \quad v_{y,fl} = v_y + ra$$

$$v_{x,fr} = v_x + rT_f/2, \quad v_{y,fr} = v_y + ra$$

$$v_{x,rl} = v_x - rT_r/2, \quad v_{y,rl} = v_y - rb$$

$$v_{x,rr} = v_x + rT_r/2, \quad v_{y,rr} = v_y - rb \quad (2)$$

The wheel speeds at each wheel are calculated (84) from the longitudinal and lateral velocities using Equation 3:

$$v_{ws,fl} = v_{x,fl} \cos \delta_f + v_{y,fl} \sin \delta_f$$

$$v_{ws,fr} = v_{x,fr} \cos \delta_f + v_{y,fr} \sin \delta_f$$

$$v_{ws,rl} = v_{x,rl}$$

$$v_{ws,rr} = v_{x,rr} \quad (3)$$

wherein, $v_{ws,fl}$, $v_{ws,fr}$, $v_{ws,rl}$, and $v_{ws,rr}$ represent the speeds of each respective wheel, 22-28.

The rolling radii of the wheels are calculated (86) from the following relationship:

$$v_{ws,fl} = r_{w,fl} w_{w,fl}$$

$$v_{ws,fr} = r_{w,fr} w_{w,fr}$$

$$v_{ws,rl} = r_{w,rl} w_{w,rl}$$

$$v_{ws,rr} = r_{w,rr} w_{w,rr} \quad (4)$$

wherein $r_{w,fl}$, $r_{w,fr}$, $r_{w,rl}$, and $r_{w,rr}$ are the rolling radii of each respective wheel, 22-28, and wherein $w_{w,fl}$, $w_{w,fr}$, $w_{w,rl}$, and $w_{w,rr}$ are the rotational speeds of each respective wheel, 22-28.

The rolling radii of the wheels are then updated (88) using either a statistical estimation or updating method such as, but not limited to moving average method or a recursive least square method as is known in the art. Statistical estimation methods are disclosed in "Applied Optimal Estimation" by Arthur Gelb, 1974, The MIT Press, Massachusetts Institute of Technology, Cambridge, Mass. 02142, which is herein incorporated by reference.

If the condition the absolute value of $a_x$ is not less than $a_{x,th}$ (66), a determination is made if $a_x$ is positive, i.e. greater than zero (69). If $a_x$ is positive (72) for a vehicle which has an un-driven wheel (78), the rolling radii of each un-driven wheel is updated (82) using calculations (80), (90) similar to the calculations (84), (86), using Equations 2, 3, and 4. If $a_x$ is equal to or less than zero, the rolling radii are not updated.

Figure 5:
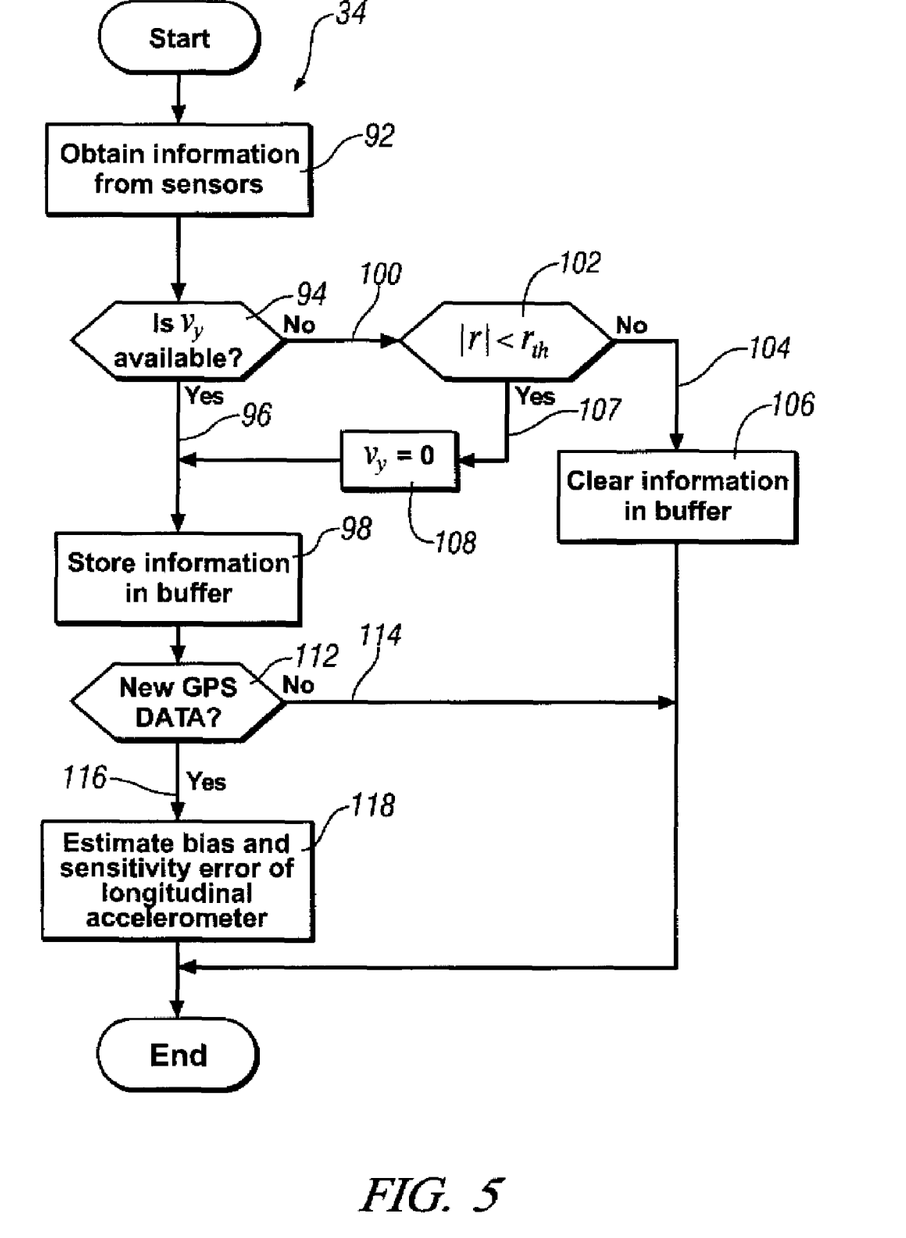
FIG. 5 is a flow-chart illustrating a process of determining bias and sensitivity error of longitudinal accelerometer.

FIG. 5 depicts a flowchart illustrating the method (34) that determines the bias and sensitivity error of the longitudinal accelerometer as generally set forth in FIG. 3. To determine bias and sensitivity error for the longitudinal accelerometer 18, longitudinal acceleration, GPS velocity, and yaw rate are obtained (92) from the sensors or systems 16. If lateral velocity, $v_y$, is available by either measurement or estimation, then lateral velocity, $v_y$, is also obtained and used to determine the bias and sensitivity error of the longitudinal accelerometer. If $v_y$ is available (94, 96), or if a following yaw rate condition shown in Equation 5 (102) is met (107), information is stored (98) in a buffer 19. If $v_y$ is available, lateral velocity information from the sensors or systems 16 is stored (98). If, however, $v_y$ is not available (100), but the yaw rate condition of Equation 5 is met (107), then $v_y$ is assumed to be zero (108) and is stored (98). If $v_y$ is not available (100), and if the yaw rate condition shown in Equation 5 is not met (104), the buffer is cleared (106), and the bias and sensitivity error of the longitudinal accelerometer are neither estimated nor updated. In Equation 5 $r_{th}$ is a vehicle dependent threshold for a yaw rate.

$$|r| < r_{th} \quad (5)$$

After storing the sensor information in the buffer (98), a determination is made whether GPS velocity data is available (112). Bias and sensitivity errors of the longitudinal accelerometer are estimated (118) as shown in more detail in FIG. 7 only when GPS velocity data is available (116).

Figure 7:
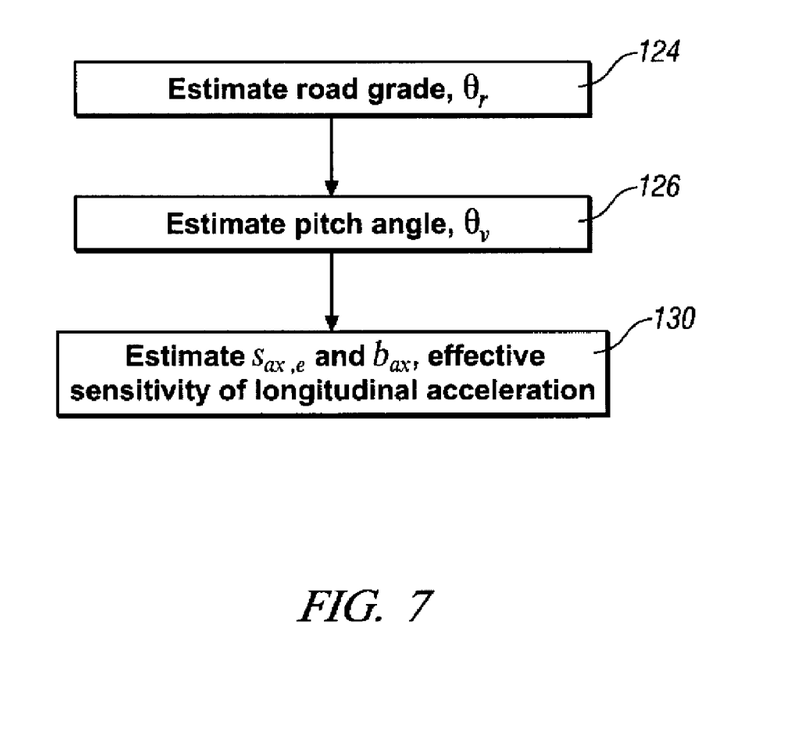
FIG. 7 is a flow-chart illustrating a process of estimating bias and sensitivity error of a longitudinal accelerometer.

With reference now to FIG. 7 which illustrates the process (118) of estimating the bias and sensitivity error of the longitudinal accelerometer as set forth in FIG. 5, the estimation of the bias and sensitivity is based on the following kinematic relationship shown in Equation 6:

$$a_x = \dot{v}_x - rv_y \quad (6)$$

wherein $a_x$ represents the acceleration of the vehicle along the vehicle's longitudinal axis (i.e. the longitudinal acceleration of the vehicle).

Figure 6:
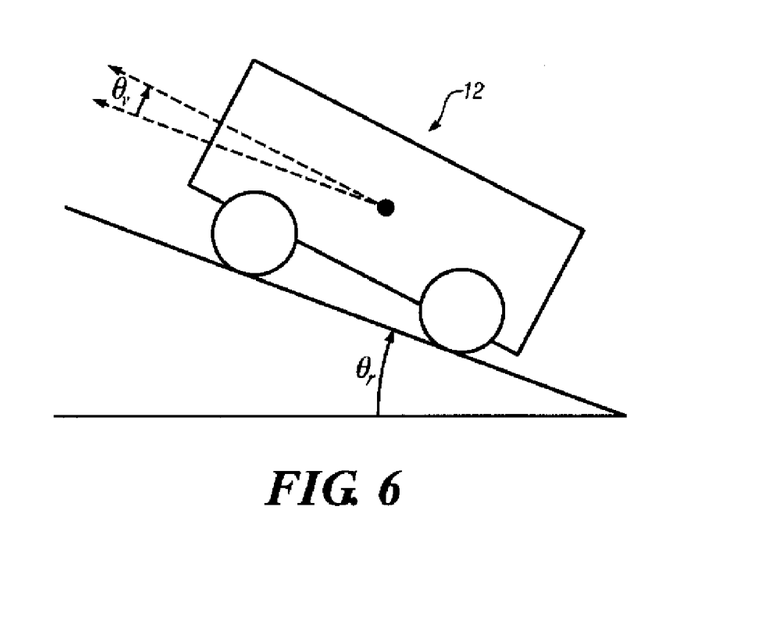
FIG. 6 is a schematic illustration of a vehicle with pitch from suspension and road grade.

For the longitudinal accelerometer 18, the acceleration of the vehicle along the accelerometer's longitudinal axis, $a_{x,sensor}$, can be modeled as shown in Equation 7:

$$a_{x,sensor} = a_x \cos\theta_v + g\sin(\theta_r + \theta_v) \quad (7)$$

$$= (\dot{v}_x - rv_y)\cos\theta_v + g\sin(\theta_r + \theta_v)$$

wherein $\theta_v$ and $\theta_r$ represent the pitch angles from the vehicle suspension and road grade respectively as shown in FIG. 6.

In addition, a determination of an effect of the sensitivity and bias on the acceleration measurement is made using the following Equations 8-9:

$$a_{x,m} = s_{ax} a_{x,sensor} + b_{ax} \quad (8)$$

wherein $a_{x,m}$ is the measured longitudinal acceleration adjusted for sensor sensitivity and offset, wherein $s_{ax}$ and $b_{ax}$ are the sensitivity and bias of the longitudinal accelerometer, respectively.

Equation 7 is substituted into Equation 8, and then, since both $\theta_r$, and $\theta_v$ are small angles Equations 7 and 8 become Equation 9:

$$a_{x,m} = s_{ax}\dot{v}_x - s_{ax} r v_y + s_{ax} g \theta_r + s_{ax} g \theta_v b_{ax} \quad (9)$$

Since the GPS system provides both horizontal and vertical velocities of the vehicle, road grade, $\theta_r$, is estimated (124) as shown in Equation 10:

$$\theta_r = \frac{v_{V,GPS}}{v_{H,GPS}} \quad (10)$$

wherein $v_{V,GPS}$ and $v_{H,GPS}$ are horizontal and vertical velocities of the vehicle based on GPS values.

Pitch angle, as shown in FIG. 6, due to vehicle suspension, $\theta_v$, is estimated (126) using the following Equation 11:

$$\theta_v = \frac{1}{k_\theta}(a_x + g\sin\theta_r) \quad (11)$$

wherein $k_\theta$ is the pitch stiffness of the vehicle.

Substituting Equation 6 into Equation 11, Equation 11 then becomes Equation 12:

$$\theta_v = \frac{1}{k_\theta}(\dot{v}_x - r v_y + g\theta_r) \quad (12)$$

Substituting Equation 12 into Equation 9, the measured longitudinal acceleration, $a_{x,m}$, can be modeled as Equation 13:

$$a_{x,m} = \left(s_{ax} + \frac{s_{ax}g}{k_\theta}\right)(\dot{v}_x - r v_y + g\theta_r) + b_{ax} \quad (13)$$
$$= s_{ax,e}(\dot{v}_x - r v_y + g\theta_r) + b_{ax}$$

wherein $\dot{v}_x$ is the acceleration of the longitudinal accelerometer, and $s_{ax,e}$ is the effective sensitivity of the longitudinal accelerometer, which includes the pitch angle effect on the accelerometer due to gravity and is defined in Equation 14:

$$s_{ax,e} = \left(s_{ax} + \frac{s_{ax}g}{k_\theta}\right) \quad (14)$$

Since every term in Equation 13 except the sensitivity and bias of the longitudinal accelerometer, $s_{ax,e}$ and $b_{ax}$, is measured or estimated, $s_{ax,e}$ and $b_{ax}$ can be estimated (130) through use of an estimation method such as a least square method using information stored in the buffer 19.

To estimate $s_{ax,e}$ and $b_{ax}$, $u_{x,delta}(t)$ is defined in Equation 15:

$$u_{x,delta}(t) = \int_0^t a_{x,m} dt' \quad (15)$$

-continued $$= s_{ax,e}\left(v_x(t) + \int_0^t (-r v_y + g\theta_r) dt'\right) + b_{ax} t + u_{x,delta,0}$$
$$= s_{ax,e} u_{x,m}(t) + b_{ax} t + u_{x,delta,0}$$

wherein $u_{x,m}(t)$ is defined in Equation 16:

$$u_{x,m}(t) = v_x(t) + \int_0^t (-r v_y + g\theta_r) dt \quad (16)$$

The problem is then formulated as in the following matrix form shown in Equation 17:

$$\begin{bmatrix} u_{x,delta}(t_0) \\ \vdots \\ u_{x,delta}(t_f) \end{bmatrix} = \begin{bmatrix} u_{x,m}(t_0) & t_0 & 1 \\ \vdots & \vdots & \vdots \\ u_{x,m}(t_f) & t_f & 1 \end{bmatrix} \begin{bmatrix} s_{ax,e} \\ b_{ax} \\ u_{x,delta,0} \end{bmatrix} \quad (17)$$

Equation 17 can be rewritten as Equation 18:

$$z_{ux} = H_{ux}\hat{x}_{us} \quad (18)$$

wherein, $$z_{ux} = \begin{bmatrix} u_{x,delta}(t_0) \\ \vdots \\ u_{x,delta}(t_f) \end{bmatrix}, H_{ux} = \begin{bmatrix} u_{x,m}(t_0) & t_0 & 1 \\ \vdots & \vdots & \vdots \\ u_{x,m}(t_f) & t_f & 1 \end{bmatrix}, \hat{x}_{ux} = \begin{bmatrix} s_{ax,e} \\ b_{ax} \\ u_{x,delta,0} \end{bmatrix} \quad (19)$$

From Equation (18), $s_{ax,e}$ and $b_{ax}$ are estimated using a least square method as shown in Equation 20:

$$\hat{x}_{ux} = (H_{ux}^T H_{us})^{-1} H^T z_{ux} \quad (20)$$

Figure 8:
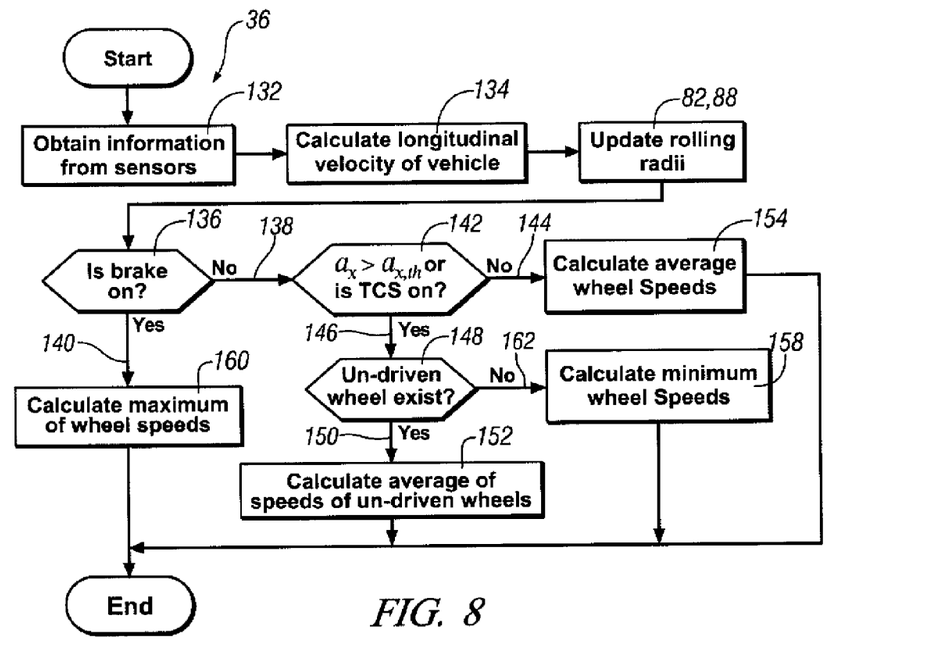
FIG. 8 is a flow-chart illustrating a process of estimating longitudinal vehicle velocity based on wheel speeds.

FIG. 8 depicts a flowchart illustrating the estimation process (36) of longitudinal velocity of the vehicle using wheel speeds as generally set forth in FIG. 3. Brake and TCS status, longitudinal acceleration, and wheel speeds are obtained (132) from the sensors or systems 16.

Four longitudinal velocities of the vehicle 12 are initially calculated (134) from the associated four wheel speeds using Equations 2-4 and the rolling radii are updated (82) or (88). A determination (136) is made to determine if a brake is on. When the vehicle is braking, the maximum of the four velocities represents the longitudinal speed of the vehicle (160). When the vehicle 12 is not braking (138), a determination is made whether $a_x$ exceeds the threshold $a_{x,th}$, or if the TCS is on (142). If $a_x$ exceeds the threshold, $a_{x,th}$, as described in Equation (1), or if the TCS is on (146), a determination is made whether an un-driven wheel exists (148). An average of the velocities from the un-driven wheels is calculated (152) and represents a vehicle longitudinal speed for a vehicle which has un-driven wheels. For a vehicle that does not have un-driven wheels (162), a minimum of the four driven wheel velocities is calculated (158) to represent the vehicle longitudinal speed for a vehicle. If either conditions $a_x > a_{x,th}$ or TCS on are not met, an average of the velocities from all four wheel speeds is calculated (154) and represents the longitudinal speed of the vehicle.

The wheel speeds are calculated using the rolling radii, which are updated in accordance with (82) or (88), as described with reference to FIG. 4.

Figure 9:
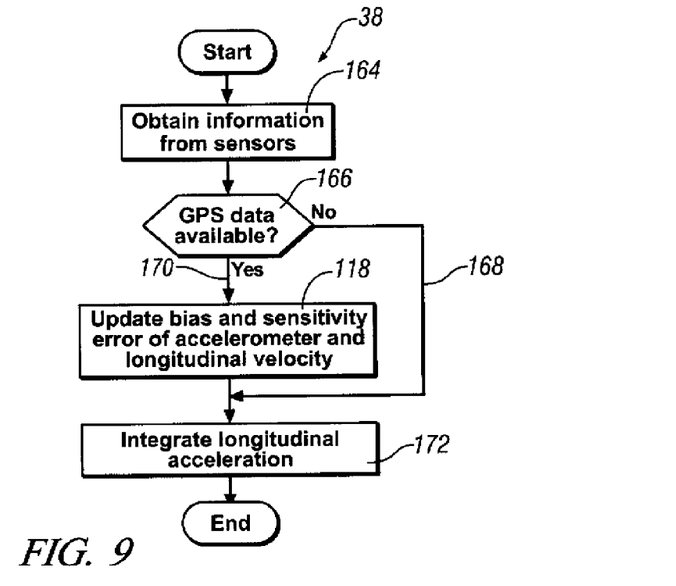
FIG. 9 is a flow-chart illustrating a process of estimating longitudinal vehicle velocity based on the integration of longitudinal acceleration.

FIG. 9 depicts a flowchart illustrating the estimation process (38) of the longitudinal velocity of vehicle using the longitudinal accelerometer 18 as generally set forth in FIG. 3. GPS velocity and longitudinal acceleration are obtained (164) from the sensors or systems 16. A determination is made whether GPS velocity data is available (166). If GPS velocity is available, the bias and sensitivity of the longitudinal accelerometer are estimated (I 18) and updated as shown in FIGS. 5 and 7. If GPS velocity data is not available (168) or if the bias and sensitivity of the longitudinal accelerometer updated (118), the longitudinal velocity of the vehicle is estimated 172 by integrating the longitudinal acceleration measurements using integration methods as are known in the art. Estimation by integration methods may include methods disclosed, for example, in "Digital Control of Dynamic Systems" by Gene F. Franklin, J. David Powell, and Michael Workman, 1998, Addison Wesley Longman, Inc., 2725 Sand Hill Road, Menlo Park, Calif. 94025 which is herein incorporated by reference.

Figure 10:
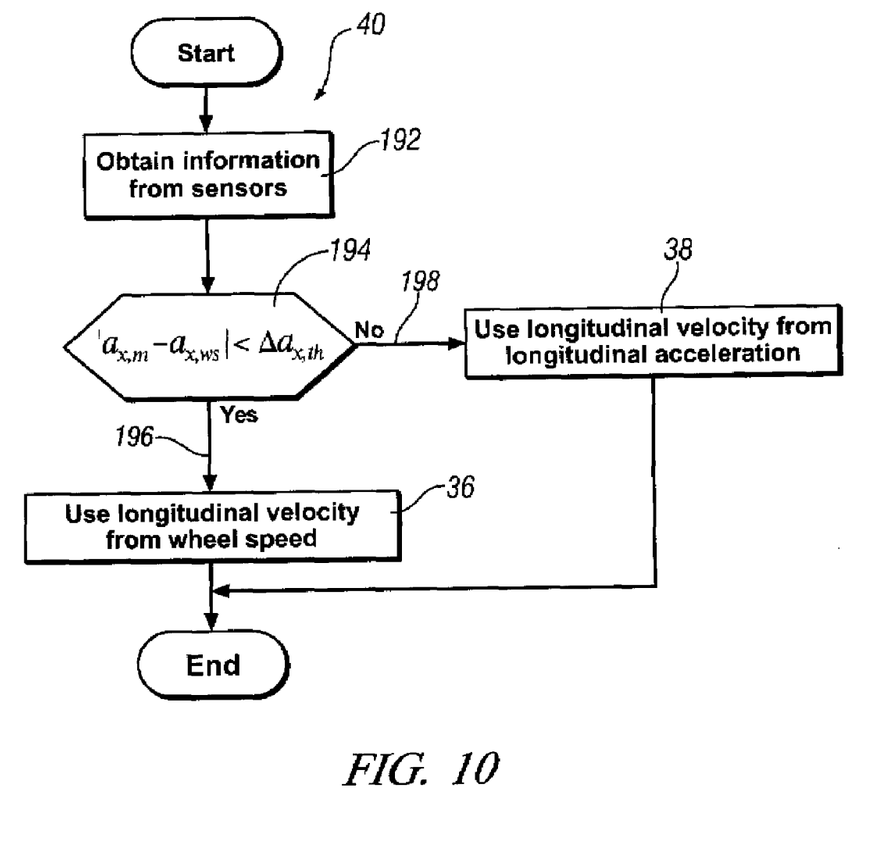
FIG. 10 is a flow-chart illustrating the procedure of determining longitudinal vehicle velocity.

FIG. 10 depicts a flowchart illustrating determination of the longitudinal velocity of the vehicle (190) based on the obtained information 192 from the sensors or systems 16. The longitudinal acceleration of the vehicle $a_{x,ws}$ is calculated by differentiating the wheel speeds. The longitudinal acceleration of the vehicle is compared with the measured longitudinal acceleration from the accelerometer $a_{x,m}$ (194). When a condition shown in Equation 21 is met (196), the longitudinal velocity estimate from the wheel speeds (36) as shown in FIG. 8 is used.

$$|a_{x,m} - a_{x,ws}| < \Delta a_{x,th} \quad (21)$$

wherein $a_{x,ws}$ is the longitudinal acceleration of the vehicle estimated using the wheel speeds, and $\Delta a_{s,th}$ is a vehicle dependent threshold. When condition shown in Equation 21 is not met (148), the longitudinal velocity estimate (38) from the longitudinal accelerometer (38) as shown in FIG. 9 is used.

The invention has been described with specific reference to the exemplary embodiments and modifications thereto. Further modifications and alterations may occur to others upon reading and understanding the specification. It is intended to include all such modifications and alterations insofar as they come within the scope of the invention.

The invention claimed is:

1. Method for determining longitudinal acceleration of a vehicle equipped with a longitudinal accelerometer and a global positioning system (GPS), comprising:
   measuring a signal from the longitudinal accelerometer;
   if at least one of a measure of vehicle lateral velocity is available and a yaw rate condition is met, determining a sensitivity and bias of the longitudinal accelerometer using a measure of vehicle longitudinal velocity provided by the GPS, the measure of vehicle lateral velocity, a measure of vehicle yaw rate, an estimated vehicle road grade and an estimated vehicle pitch angle; and
   determining longitudinal acceleration of the vehicle by applying the sensitivity and bias to the measured signal from the longitudinal accelerometer.

2. Method for determining longitudinal acceleration of a vehicle equipped with a longitudinal accelerometer and a global positioning system (GPS), comprising:
   measuring a signal from the longitudinal accelerometer;
   determining a sensitivity and bias of the longitudinal accelerometer using a measure of vehicle longitudinal velocity provided by the GPS, a measure of vehicle lateral velocity, and a measure of vehicle yaw rate;
   determining longitudinal acceleration of the vehicle by applying the sensitivity and bias to the measured signal from the longitudinal accelerometer;
   calculating longitudinal and lateral velocity at the vehicle center of gravity (CG) using GPS velocity and vehicle yaw rate;
   calculating individual wheel longitudinal and lateral velocities from the longitudinal and lateral velocity at the vehicle CG and wheel distribution relative to the vehicle CG; and
   calculating individual wheel speeds using the individual wheel longitudinal and lateral velocities and steering angles.

3. The method as claimed in claim 2 further comprising:
   calculating individual wheel rolling radii using individual wheel rotational speeds and the individual wheel speeds.

4. The method as claimed in claim 1 further comprising:
   determining an estimated vehicle longitudinal velocity by integrating the longitudinal acceleration.

5. The method as claimed in claim 2 further comprising:
   determining an estimated vehicle longitudinal velocity from the individual wheel speeds.

6. The method as claimed in claim 5 further comprising:
   selectively determining the estimated vehicle longitudinal velocity from one of a maximum one of the individual wheel speeds, a minimum one of the individual wheel speeds, and an average of the individual wheel speeds corresponding to un-driven ones of the individual wheels.

7. The method as claimed in claim 2 further comprising:
   determining a first estimated vehicle longitudinal velocity by integrating the longitudinal acceleration;
   determining a second estimated vehicle longitudinal velocity from the individual wheel speeds; and
   determining the vehicle longitudinal velocity as one of the first and second estimated vehicle longitudinal velocities.

8. Method of using a vehicle dynamics control system in a vehicle having a longitudinal accelerometer, a global positioning system (GPS) and a plurality of wheels, comprising:
   receiving longitudinal acceleration data from the longitudinal accelerometer;
   receiving GPS velocity data from the GPS;
   using GPS velocity data in determining corrections for the longitudinal acceleration data and in determining vehicle velocity; and
   if at least one of a measure of vehicle lateral velocity is available and a yaw rate condition is met, estimating a bias and a sensitivity error each associated with a longitudinal accelerometer.

9. Method of using a vehicle dynamics control system in a vehicle having a longitudinal accelerometer, a global positioning system (GPS) and a plurality of wheels, comprising:
   receiving longitudinal acceleration data from the longitudinal accelerometer;
   receiving GPS velocity data from the GPS;
   using GPS velocity data in determining corrections for the longitudinal acceleration data and in determining vehicle velocity;
   calculating longitudinal velocities at all of the plurality of wheels using GPS velocity data if neither an ABS or a TCS is active and if an absolute value of a longitudinal acceleration of the vehicle is less than a vehicle independent threshold for longitudinal acceleration; and
   calculating longitudinal velocities only at un-driven ones of the plurality wheels using GPS velocity data if neither an ABS or a TCS is active and if longitudinal acceleration of the vehicle is positive and not less than the vehicle threshold for longitudinal acceleration.

10. The method of 9 wherein calculating longitudinal velocities comprises:

calculating longitudinal and lateral velocities of the vehicle at a center of gravity of the vehicle using GPS velocity data; and calculating longitudinal and lateral velocities at a wheel using the calculated longitudinal and lateral velocities of the vehicle at a center of gravity of the vehicle.

11. The method of claim 10 further comprising:

calculating a wheel speed of the wheel using the calculated longitudinal and lateral velocities at the wheel.

12. The method of claim 1 further comprising:

calculating a rolling radius of the wheel using the calculated wheel speed and a rotational speed of the wheel.

13. Method of using a vehicle dynamics control system in a vehicle having a longitudinal accelerometer, a global positioning system (GPS) and a plurality of wheels, comprising:

receiving longitudinal acceleration data from the longitudinal accelerometer;

receiving GPS velocity data from the GPS;

using GPS velocity data in determining corrections for the longitudinal acceleration data and in determining vehicle velocity;

estimating a bias and a sensitivity error each associated with a longitudinal accelerometer;

obtaining data including longitudinal acceleration, GPS velocity, and yaw rate from a plurality of associated sensors;

storing the obtained data in a buffer if lateral velocity of the GPS velocity is available; and estimating bias and sensitivity error of a longitudinal accelerometer if lateral velocity of the GPS velocity is available, and if new GPS velocity data is available once the obtained data is stored in the buffer.

* * * * *